US012690112B2

(12) United States Patent
Wakana

(10) Patent No.: US 12,690,112 B2
(45) Date of Patent: Jul. 21, 2026

(54) ILLUMINATION DEVICE

(71) Applicant: Japan Display Inc., Tokyo (JP)

(72) Inventor: Hiroyuki Wakana, Tokyo (JP)

(73) Assignee: Japan Display Inc., Tokyo (JP)

( * ) Notice: Subject to any disclaimer, the term of this patent is extended or adjusted under 35 U.S.C. 154(b) by 57 days.

(21) Appl. No.: 18/794,713

(22) Filed: Aug. 5, 2024

(65) Prior Publication Data

US 2024/0397599 A1     Nov. 28, 2024

Related U.S. Application Data

(63) Continuation of application No. PCT/JP2023/002557, filed on Jan. 27, 2023.

(30) Foreign Application Priority Data

Feb. 22, 2022     (JP) ................................. 2022-025599

(51) Int. Cl.
| $H05B\ 47/10$ | (2020.01) |
| $G02F\ 1/1347$ | (2006.01) |
| $H05B\ 47/16$ | (2020.01) |
| $H05B\ 47/165$ | (2020.01) |

(52) U.S. Cl.
CPC ........... H05B 47/16 (2020.01); G02F 1/1347 (2013.01); H05B 47/165 (2020.01)

(58) Field of Classification Search
CPC ........ H05B 45/10; H05B 47/10; H05B 47/16; H05B 47/165; G02F 1/1347
See application file for complete search history.

(56) References Cited

U.S. PATENT DOCUMENTS 9,613,433 B2 * 4/2017 Nolan ........................ G06T 7/60

FOREIGN PATENT DOCUMENTS

| JP | H02-065001 A | 3/1990 |
| JP | 2001-281054 A | 10/2001 |
| JP | 2007335101 A | * 12/2007 |
| JP | 2016-051608 A | 4/2016 |

OTHER PUBLICATIONS

Search Report issued in related International Patent Application No. PCT/JP2023/002557 on Feb. 28, 2023 and English translation of same. 6 pages.
Office Action issued in related Japanese Patent Application No. 2024-502934, mailed on Oct. 1, 2024 and English translation of same. 5 pages.

* cited by examiner

*Primary Examiner* — Jimmy T Vu
(74) *Attorney, Agent, or Firm* — K&L Gates LLP

(57) ABSTRACT

An illumination device includes a light source part configured to emit light to a floor surface of a room, a storage configured to store light distribution area data in association with time information, the light distribution area data being related to an area to be irradiated with light in the room, a time information acquirer configured to acquire time information related to current time, a light distribution area setter for setting a light distribution area of light from the light source part, and a controller configured to read out, from the storage, light distribution area data corresponding to the time information acquired by the time information acquirer and control the light distribution area setter based on the light distribution area data.

11 Claims, 15 Drawing Sheets

| TIME | 6:00 | 9:00 | 12:00 | 15:00 | 18:00 |
|---|---|---|---|---|---|
| LIGHT DISTRIBUTION AREA | H22 | H23 | H22 | H11 | H12 |
| SHAPE AND SIZE | | | | | |

FIG.4

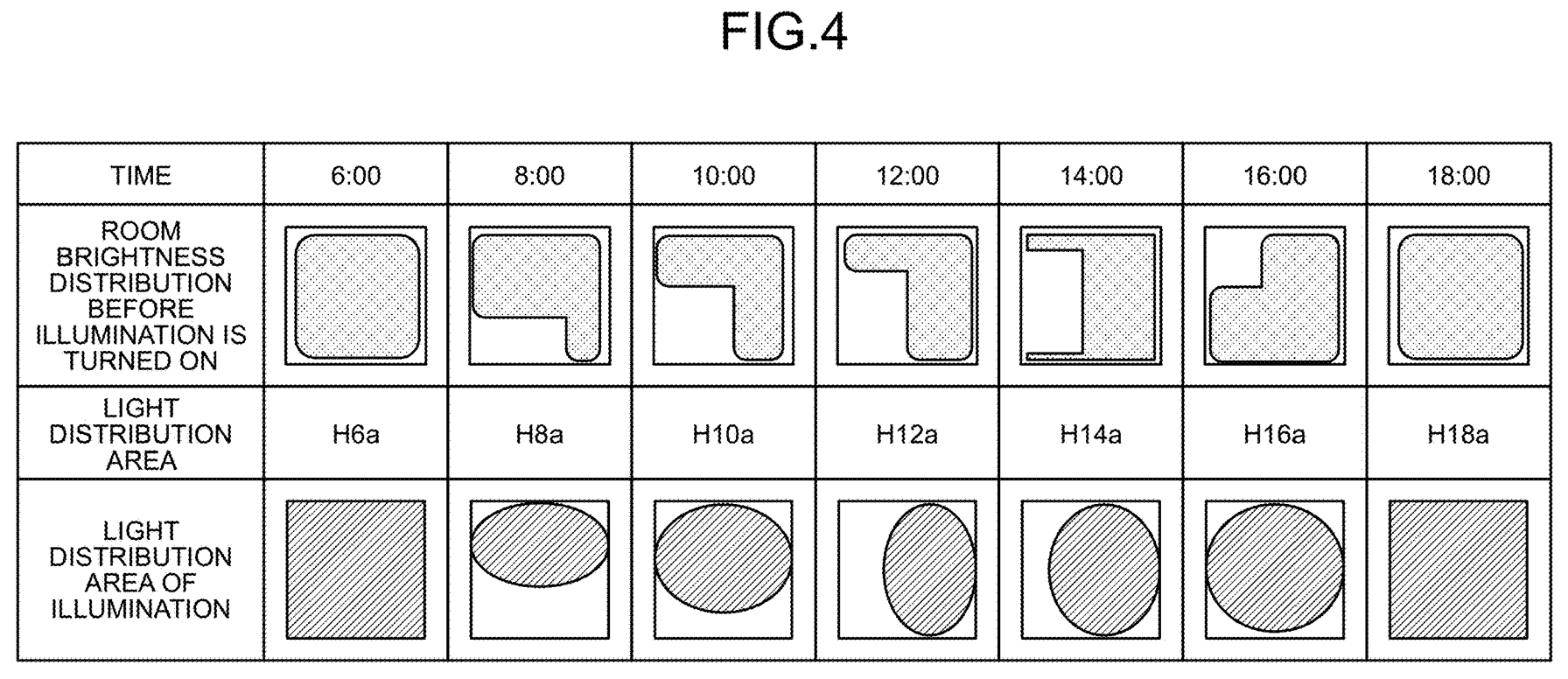

| TIME | 6:00 | 8:00 | 10:00 | 12:00 | 14:00 | 16:00 | 18:00 |
|---|---|---|---|---|---|---|---|
| ROOM BRIGHTNESS DISTRIBUTION BEFORE ILLUMINATION IS TURNED ON | | | | | | | |
| LIGHT DISTRIBUTION AREA | H6a | H8a | H10a | H12a | H14a | H16a | H18a |
| LIGHT DISTRIBUTION AREA OF ILLUMINATION | | | | | | | |

TIME

TIME

FIG.19

ILLUMINATION DEVICE

CROSS-REFERENCE TO RELATED APPLICATION

This application is a continuation of International Patent Application No. PCT/JP2023/002557 filed on Jan. 27, 2023 which designates the United States, incorporated herein by reference, and which claims the benefit of priority from Japanese Patent Application No. 2022-025599 filed on Feb. 22, 2022, incorporated herein by reference.

BACKGROUND

1. Technical Field

The present disclosure relates to an illumination device.

2. Description of the Related Art

Japanese Patent Application Laid-open Publication No. H02-065001 (JP-A-H02-065001) discloses an illumination instrument including a liquid crystal light adjustment element. In the illumination instrument disclosed in JP-A-H02-065001, light adjustment is performed by providing an electric signal to the liquid crystal light adjustment element.

In a case where a room has a window, brightness in the room differs with time. Light entering the room through the window differs with time, and for example, light entering the room through the window in the morning is different from that in the afternoon, and accordingly, brightness in the room in the morning is different from that in the afternoon. Thus, it is impossible to achieve uniform brightness in the room irrespective of time.

The present disclosure is made in view of the above-described problem and intended to provide an illumination device capable of achieving uniform brightness in a room irrespective of time.

SUMMARY

An illumination device according to an embodiment of the present disclosure includes a light source part configured to emit light to a floor surface of a room, a storage configured to store light distribution area data in association with time information, the light distribution area data being related to an area to be irradiated with light in the room, a time information acquirer configured to acquire time information related to current time, a light distribution area setter for setting a light distribution area of light from the light source part, and a controller configured to read out, from the storage, light distribution area data corresponding to the time information acquired by the time information acquirer and control the light distribution area setter based on the light distribution area data.

BRIEF DESCRIPTION OF THE DRAWINGS

FIG. 2 is a diagram illustrating exemplary operation of the illumination device;

FIG. 3 is a conceptual diagram illustrating an example of the storage contents of a storage for achieving the operation in FIG. 2;

FIG. 4 is a conceptual diagram illustrating an example of the storage contents of the storage and the like in a second embodiment;

FIG. 19 is a schematic diagram illustrating an example of light distribution control by a light distribution control region.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

First Embodiment

Figure 1:
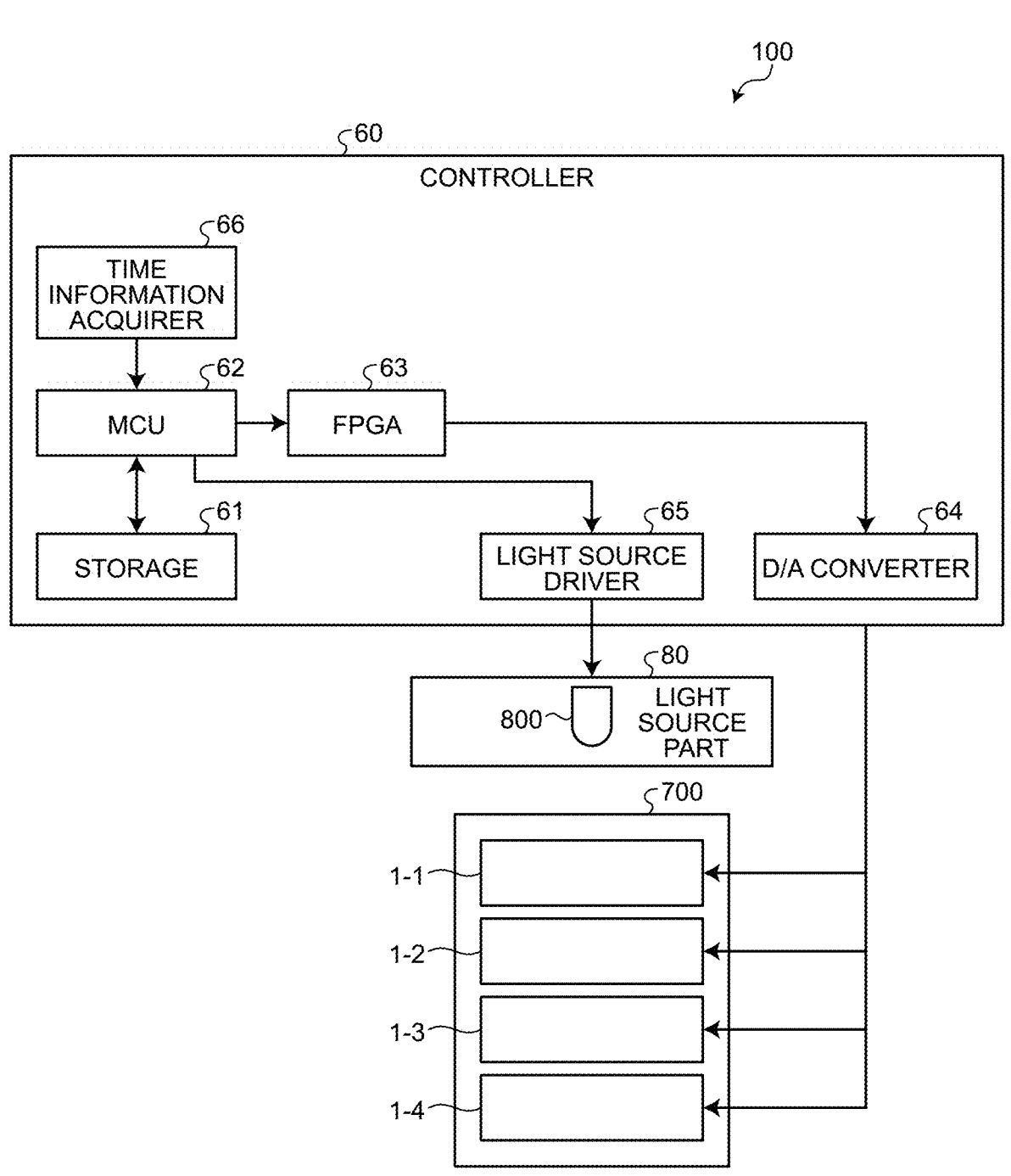
FIG. 1 is a block diagram illustrating a functional configuration of an illumination device according to a first embodiment of the present disclosure.
Figure 2:
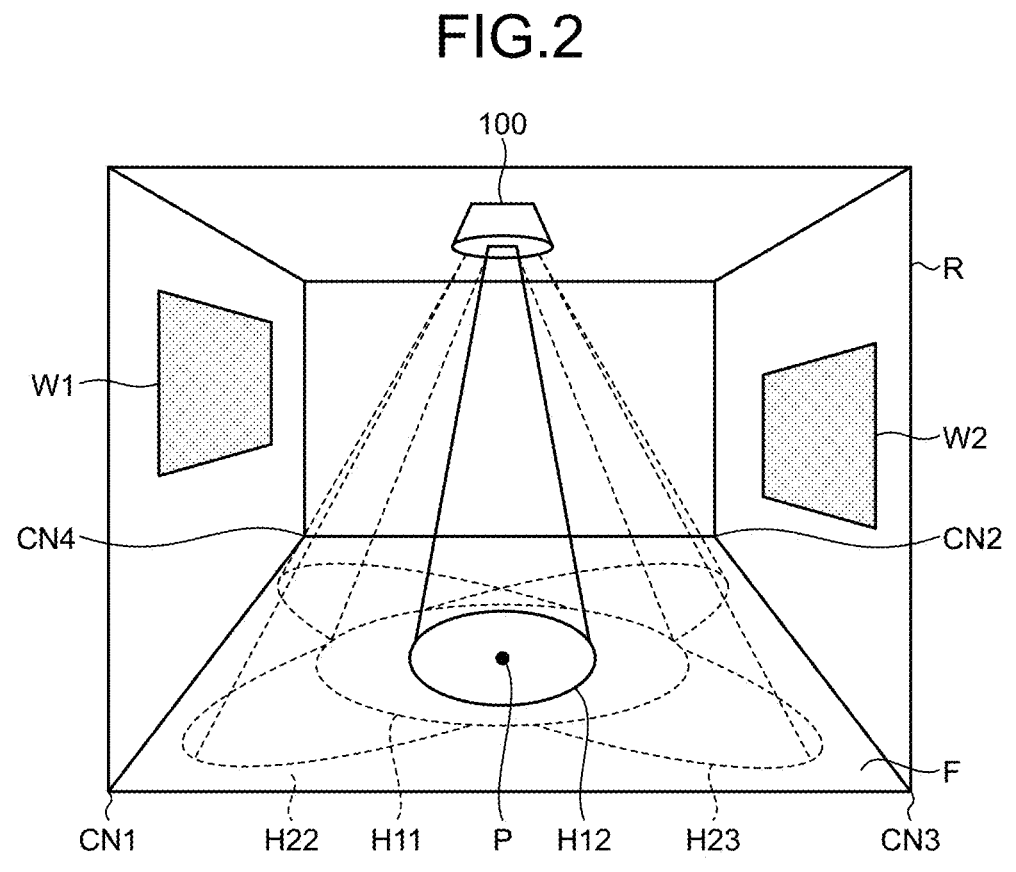

FIG. 1 is a block diagram illustrating a functional configuration of an illumination device 100 according to a first embodiment of the present disclosure. FIG. 2 is a diagram illustrating exemplary operation of the illumination device 100. In FIG. 1, the illumination device 100 includes a light source part 80, a liquid crystal light distribution part 700, and a controller 60. The light source part 80 includes a light source 800. The liquid crystal light distribution part 700 includes a plurality of liquid crystal light distribution panels 1-1 to 1-4.

The illumination device 100 is an illumination device provided to allow individual control of an irradiation area (light distribution area) of light from the light source 800 of the light source part 80 by using the liquid crystal light distribution part 700. The liquid crystal light distribution part 700 functions as a light distribution area setter for setting the light distribution area of light from the light source 800. As illustrated in FIG. 2, with the liquid crystal light distribution part 700, it is possible to achieve a light distribution area H11 in which light from the light source 800 is widely diffused and a light distribution area H12 in which light from the light source 800 is narrowly diffused. The liquid crystal light distribution part 700 includes a liquid crystal light distribution panel for p-wave polarization and a liquid crystal light distribution panel for s-wave polarization. A detailed configuration of the liquid crystal light distribution panels included in the liquid crystal light distribution part 700 will be described later.

As illustrated in FIG. 1, the controller 60 includes a storage 61, a micro controller unit (MCU) 62, a field programmable gate array (FPGA) 63, a digital/analog (D/A) converter 64, a light source driver 65, and a time information acquirer 66.

The storage 61 stores time and light distribution area data in association. The storage contents of the storage 61 will be described later.

The MCU 62 can read out the light distribution area data corresponding to time from the storage 61. The MCU 62 outputs various signals to the FPGA 63 and the light source driver 65. The MCU 62 controls each component of the illumination device 100.

Under control by the MCU 62, the FPGA 63 performs information processing for controlling operation of the liquid crystal light distribution part 700 and outputs a signal indicating a result of the information processing to the D/A converter 64.

The D/A converter 64 outputs, based on a digital signal that is a signal from the FPGA 63, an analog signal for operating the liquid crystal light distribution panels 1-1 to 1-4 included in the liquid crystal light distribution part 700. The configuration may be one circuit or may include a plurality of circuits.

The light source driver 65 is a controller that performs, under control by the MCU 62, ON/OFF control of the light source 800 included in the light source part 80 and light emission intensity control when the light source 800 is ON. The controller may be one circuit or may include a plurality of circuits.

The time information acquirer 66 acquires time information related to current time. The time information acquirer 66 may acquire time information from a clock unit (not illustrated) inside the illumination device 100 or may acquire time information from a communication network or the like outside the illumination device 100.

The controller 60 reads out, from the storage 61, light distribution area data corresponding to time information acquired by the time information acquirer 66. The controller 60 reads out the light distribution area data from the storage

61 at regular intervals. The controller 60 controls the liquid crystal light distribution part 700 based on the light distribution area data.

The illumination device 100 configured as described above acquires time information by the time information acquirer 66 and reads out light distribution area data from the storage 61 based on the acquired time information. The light distribution area data includes data related to light distribution shape and data related to size. The illumination device 100 controls the liquid crystal light distribution part 700 so that light from the light source 800 of the light source part 80 has the light distribution shape and the size according to the light distribution area data read out.

FIG. 2 illustrates exemplary operation of the illumination device 100 installed on the ceiling of a room R. For simplification of description, furniture and other items in the room R are omitted from the illustration. In FIG. 2, the room R is provided with a window W1 and a window W2. External light is incident in the room R through the windows W1 and W2. The amount of external light incident in the room R differs with time. In the present example, the light distribution area of light emitted from the illumination device 100 to a floor F is changed. The illumination device 100 changes the light distribution area based on time information. By changing the light distribution area, the room R can be kept at the same brightness at any time or can be set to a desired brightness in accordance with time.

In the present example, the light distribution area of the illumination device 100 is light distribution areas H11, H12, H22, and H23. The floor F of the room R has a rectangular shape.

The light distribution areas H11 and H12 are circles. The circle of the light distribution area H11 and the circle of the light distribution area H12 share the same central point P. The circle of the light distribution area H11 is larger than the circle of the light distribution area H12. The light distribution areas H11 and H12 can be achieved by emitting light substantially directly downward from the illumination device 100.

The light distribution areas H22 and H23 are ellipses. The ellipse of the light distribution area H22 and the ellipse of the light distribution area H22 share the same central point P. The major radius of the ellipse of the light distribution area H22 points toward corners CN1 and CN2 that are opposing corners of the floor F. The major radius of the ellipse of the light distribution area H23 points toward corners CN3 and CN4 that are opposing corners of the floor F.

For example, the illumination device 100 changes the light distribution area in accordance with time in the order of the light distribution areas H22, H23, H22, H11, and H12. By changing the light distribution area in this manner, light can be emitted in the room R as described below, for example. Specifically, after sunrise, the light distribution area is slowly and smoothly changed through the light distribution areas H22, H23, and H23 in accordance with external light from the windows W1 and W2 and in accordance with time elapse to illuminate dark parts in the room R. After sunset upon further elapse of time, a large area of the room R can be illuminated with the light distribution area H11, and then the center of the room R can be illuminated with the light distribution area H12 at dinner.

Example of Storage Contents of Storage

FIG. 3 is a conceptual diagram illustrating an example of the storage contents of the storage 61 for achieving the operation in FIG. 2. As illustrated in FIG. 3, the storage 61 stores time and light distribution area data in association. Specifically, each pair of time "6:00" and light distribution area data of "light distribution area H22", time "9:00" and light distribution area data of "light distribution area H23", time "12:00" and light distribution area data of "light distribution area H22", time "15:00" and light distribution area data of "light distribution area H11", and time "18:00" and light distribution area data of "light distribution area H12" is stored in association.

As described above, the MCU 62 sequentially acquires time information. The MCU 62 reads out, from the storage 61, light distribution area data corresponding to the acquired time information. In a case where no light distribution area data corresponding to the acquired time information is stored in the storage 61, light distribution area data corresponding to time information close to the acquired time information is read out from the storage 61.

Light distribution area data has contents indicating a light distribution shape and a size, and the MCU 62 calculates panel voltage based on the light distribution shape and the size. The panel voltage is voltage applied to each of the liquid crystal light distribution panels 1-1 to 1-4 in the liquid crystal light distribution part 700. Under control by the MCU 62, the FPGA 63 performs information processing for controlling operation of the liquid crystal light distribution part 700 and outputs a signal indicating a result of the information processing to the D/A converter 64. Analog voltage as a result of conversion by the D/A converter 64 is input to the liquid crystal light distribution part 700. Accordingly, each of the liquid crystal light distribution panels 1-1 to 1-4 in the liquid crystal light distribution part 700 is controlled, and distributed light is emitted to the floor F.

In a case where current time information or time information close thereto is time "6:00", light distribution area data of "light distribution area H22" is read out from the storage 61. Accordingly, as illustrated in FIG. 2, elliptical light according to the light distribution area data of light distribution area H22" is emitted to the floor F.

In a case where current time information or time information close thereto is time "9:00", light distribution area data of "light distribution area H23" is read out from the storage 61. Accordingly, as illustrated in FIG. 2, elliptical light according to light distribution area data of "light distribution area H23" is emitted to the floor F.

In a case where current time information or time information close thereto is time "12:00", light distribution area data of "light distribution area H22" is read out from the storage 61. Accordingly, as illustrated in FIG. 2, elliptical light according to light distribution area data of "light distribution area H22" is emitted to the floor F.

In a case where current time information or time information close thereto is time "15:00", light distribution area data of "light distribution area H11" is read out from the storage 61. Accordingly, as illustrated in FIG. 2, circular light according to light distribution area data of "light distribution area H11" is emitted to the floor F.

In a case where current time information or time information close thereto is time "18:00", light distribution area data of "light distribution area H12" is read out from the storage 61. Accordingly, as illustrated in FIG. 2, circular light according to light distribution area data of "light distribution area H12" is emitted to the floor F.

As described above, light distribution area data is sequentially read out from the storage 61 based on time information of the current time, and light corresponding to the light distribution area data read out is emitted to the floor F. By appropriately setting the light distribution area data, uniform brightness can be achieved in the room irrespective of time.

Second Embodiment

The following describes a second embodiment of the present disclosure. In the second embodiment, the brightness of the room R is kept as uniform as possible from sunrise time to sunset time. The illumination device 100 of the second embodiment has the same basic configuration as that of the first embodiment, but the storage contents of the storage 61 are different.

FIG. 4 is a conceptual diagram illustrating an example of the storage contents of the storage 61 and the like in the second embodiment. In the present example as well, the storage 61 stores time and light distribution area data in association. Specifically, each pair of time "6:00" close to the sunrise time and light distribution area data of "light distribution area H6a", time "8:00" and light distribution area data of "light distribution area H8a", time "10:00" and light distribution area data of "light distribution area H10a", time "12:00" and light distribution area data of "light distribution area H12a", time "14:00" and light distribution area data of "light distribution area H14a", time "16:00" and light distribution area data of "light distribution area H16a", and time "18:00" close to the sunset time and light distribution area data of "light distribution area H18a" is stored in association. By storing light distribution area data in the storage 61 in association with time information from sunrise time to sunset time, the brightness of the room R can be adjusted at least from the sunrise time to the sunset time. To irradiate the entire floor with light like the light distribution area H6a, the liquid crystal light distribution part 700 is controlled to emit light to an area larger than the rectangular floor and up to walls surrounding the floor. This is the same for the light distribution area H18a as well.

In the present example, the controller 60 controls the liquid crystal light distribution part 700 so that the light distribution area has a shape close to the shape of a dark part (illustrated by shading) of the room R in distribution of the brightness of the room R before illumination is turned on. The light distribution area of the illumination, in other words, the irradiation area of light (illustrated by hatching) is changed in accordance with time elapse. By bringing the light distribution area closer to the shape of a dark part of the room R, the brightness of the room R can be kept uniform throughout day.

In the present example, light distribution areas in accordance with the times of day at two-hour intervals are determined as initial values, and each time and the corresponding light distribution area data are associated and stored in the storage 61 in advance. This processing is initial setting processing to be described later. In the initial setting processing, N (N is an integer equal to or larger than two) pairs of associated time and light distribution area data are stored in the storage 61. Accordingly, the storage 61 stores at least two (in other words, N=2 or larger) pairs of associated time and light distribution area data. Then, by reading out the pairs from the storage 61 based on current time information, the irradiation area of light can be changed in accordance with time elapse. The irradiation area of light can be changed in a more complicated manner by increasing the number of the above-described pairs stored in the storage 61. It is preferable to smoothly change the shape of the light distribution area.

Other Examples of Change of Light Distribution
Shape and Size

In addition to the above description, light distribution shape and size can be flexibly changed by the liquid crystal light distribution part 700. The following describes examples of changing light distribution shape and size.

Figure 5:
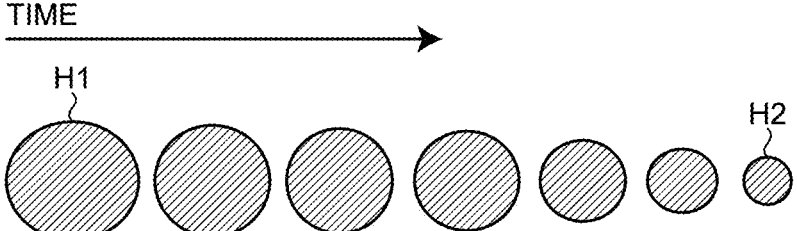
FIG. 5 is a diagram illustrating an example of gradually changing the size of a light distribution area.

FIG. 5 is a diagram illustrating an example of gradually changing the size of the light distribution area. As illustrated in FIG. 5, emitted light can be gradually changed from a light distribution area H1 to a light distribution area H2 by voltage input to the liquid crystal light distribution part 700.

Figure 6:
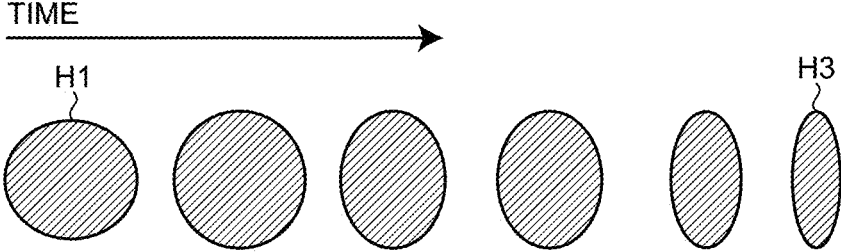
FIG. 6 is a diagram illustrating an example of gradually changing the shape of the light distribution area from a circle to an ellipse.

FIG. 6 is a diagram illustrating an example of gradually changing the shape of the light distribution area from a circle to an ellipse. As illustrated in FIG. 6, emitted light can be gradually changed from a light distribution area H1 to a light distribution area H3 by voltage input to the liquid crystal light distribution part 700.

Figure 7:
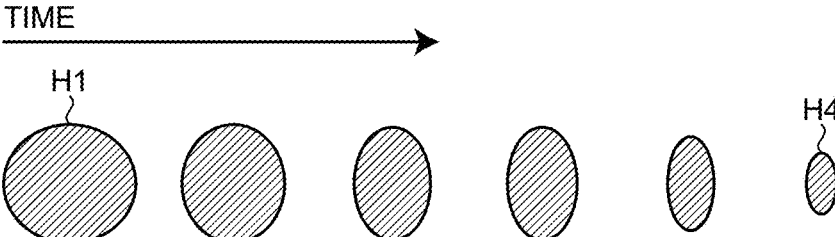
FIG. 7 is a diagram illustrating an example of gradually changing the shape and size of the light distribution area simultaneously.

FIG. 7 is a diagram illustrating an example of gradually changing the shape and size of the light distribution area simultaneously. As illustrated in FIG. 7, emitted light can be gradually changed from a light distribution area H1 to a light distribution area H4 by voltage input to the liquid crystal light distribution part 700.

Figure 8:
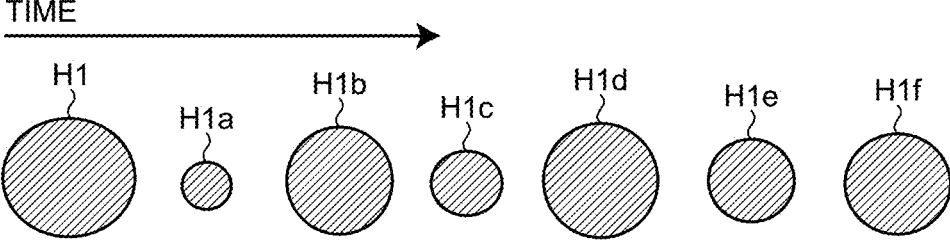
FIG. 8 is a diagram illustrating an example of changing the size of the light distribution area so that the size is instantaneously switched between large and small.

FIG. 8 is a diagram illustrating an example of changing the size of the light distribution area so that the size is instantaneously switched between large and small. As illustrated in FIG. 8, emitted light can be gradually changed from the light distribution area H1 to light distribution areas H1a, H1b, H1c, H1d, H1e, and H1f in the stated order by voltage input to the liquid crystal light distribution part 700.

Figure 9:
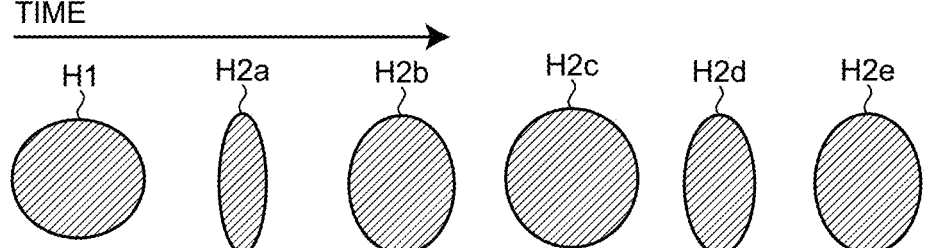
FIG. 9 is a diagram illustrating an example of instantaneously switching the shape of the light distribution area.

FIG. 9 is a diagram illustrating an example of instantaneously switching the shape of the light distribution area. As illustrated in FIG. 9, emitted light can be changed from the circular light distribution area H1 to elliptical light distribution areas H2a and H2b, a circular light distribution area H2c, and elliptical light distribution areas H2d and H2e in the stated order by voltage input to the liquid crystal light distribution part 700.

Figure 10:
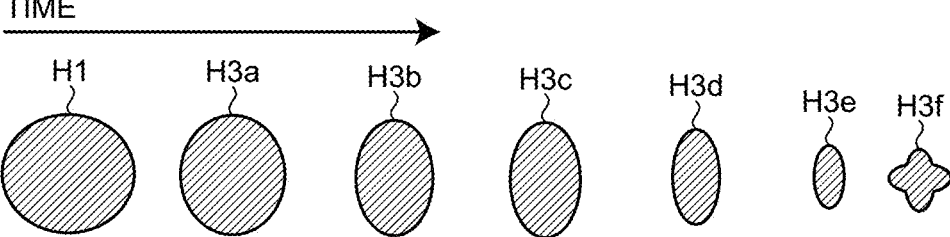
FIG. 10 is a diagram illustrating an example of changing the size and shape of the light distribution area little by little.

FIG. 10 is a diagram illustrating an example of changing the size and shape of the light distribution area little by little. As illustrated in FIG. 10, emitted light can be changed little by little from the circular light distribution area H1 to light distribution areas H3a, H3b, H3c, H3d, H3e, and H3f in the stated order by voltage input to the liquid crystal light distribution part 700.

Initial Setting Processing

Figure 11:
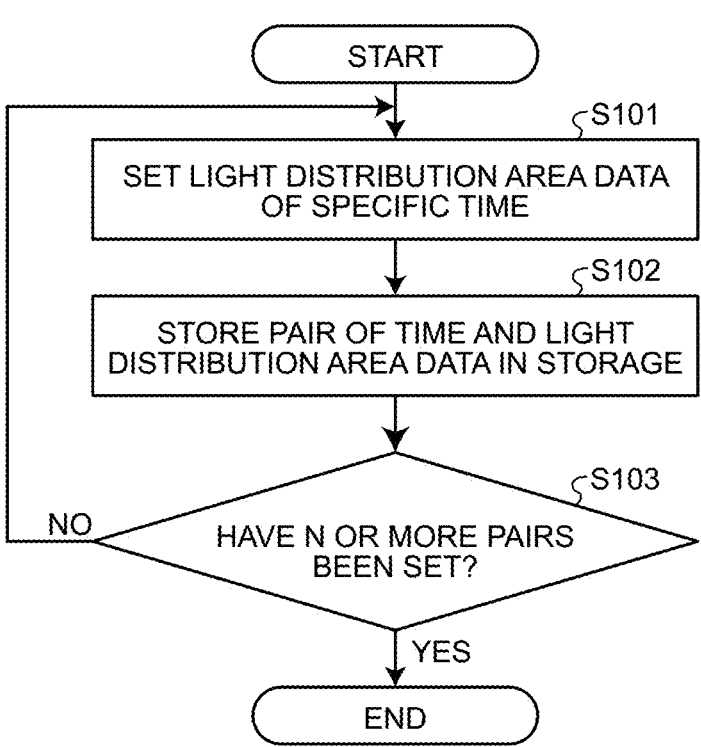
FIG. 11 is a flowchart illustrating an example of initial setting processing by a controller of the illumination device.

FIG. 11 is a flowchart illustrating an example of the initial setting processing by the controller 60 of the illumination device 100. As illustrated in FIG. 11, first, specific time and the light distribution area data of the time are set (step S101). As described above, the light distribution area data includes data related to light distribution shape and data related to size. The time and the light distribution area data are set by a non-illustrated input means such as a keyboard or a mouse under control of an MCU 602. The MCU 602 stores the pair of time and light distribution area data thus set in the storage 61 (step S102).

Subsequently, the MCU 602 determines whether N or more pairs of associated time and light distribution area data have been set (step S103). In a case where the number of the pairs is smaller than N at step S103 (No at step S103), the MCU 602 returns to step S101 to continue the processing. In a case where the number of the pairs is equal to or larger than N at step S103 (Yes at step S103), the initial setting processing by the MCU 602 ends.

Processing by Controller

Figure 12:
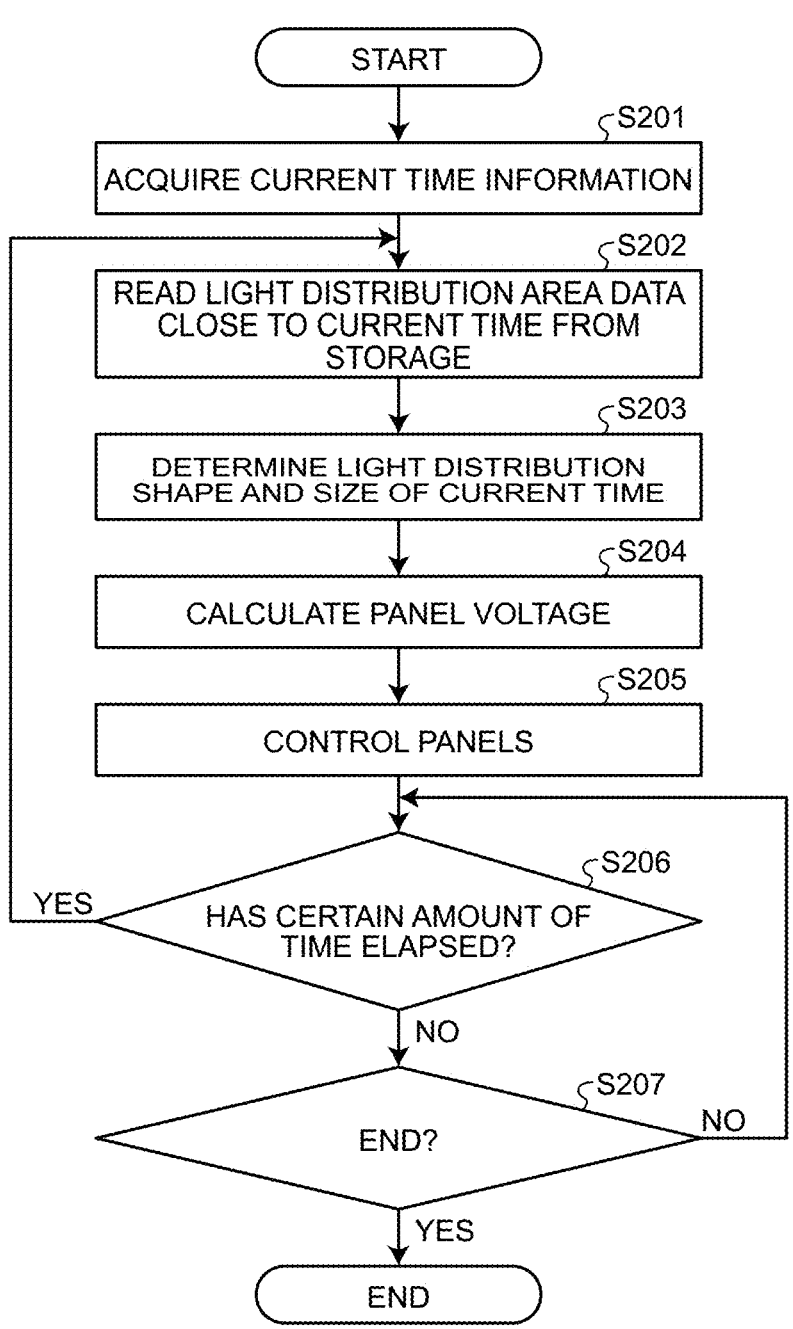
FIG. 12 is a flowchart illustrating an example of processing by the controller of the illumination device.

FIG. 12 is a flowchart illustrating an example of processing by the controller 60 of the illumination device 100. FIG. 12 mainly illustrates the contents of processing by the MCU 62.

In FIG. 12, the MCU 62 acquires current time information from the time information acquirer 66 (step S201). The MCU 62 reads out light distribution area data corresponding to time close to the current time from the storage 61 based on the acquired time information (step S202).

The MCU 62 determines a light distribution shape and a size of the current time based on the light distribution area data read out from the storage 61 (step S203). The MCU 62 calculates panel voltage to be applied to the liquid crystal light distribution panels 1-1 to 1-4 of the liquid crystal light distribution part 700 (step S204). The MCU 62 controls the liquid crystal light distribution panels 1-1 to 1-4 by applying the panel voltage calculated at step S204 (step S205).

Subsequently, the MCU 62 determines whether a certain amount of time has elapsed (step S206). In a case where the certain amount of time has elapsed as a result of the determination at step S206 (Yes at step S206), the process returns to step S202 to continue the processing.

In a case where the certain amount of time has not elapsed as a result of the determination at step S206 (No at step S206), it is determined whether to end the processing (step S207). In a case where the processing is not to be ended as a result of the determination at step S207 (No at step S207), the process returns to step S206 to continue the processing. Accordingly, the same light distribution area is maintained until the certain amount of time elapses. In other words, the light distribution shape and the size are maintained until the certain amount of time elapses.

In a case where the processing is to be ended as a result of the determination at step S207 (Yes at step S207), the processing by the controller 60 ends.

As described above, the illumination device 100 controls the liquid crystal light distribution part 700 so that light from the light source 800 of the light source part 80 has a light distribution shape and a size according to light distribution area data read out.

Liquid Crystal Light Distribution Panel

The liquid crystal light distribution panels 1-1 to 1-4 included in the liquid crystal light distribution part 700 will be described below with reference to FIGS. 13 to 17.

Figure 13:
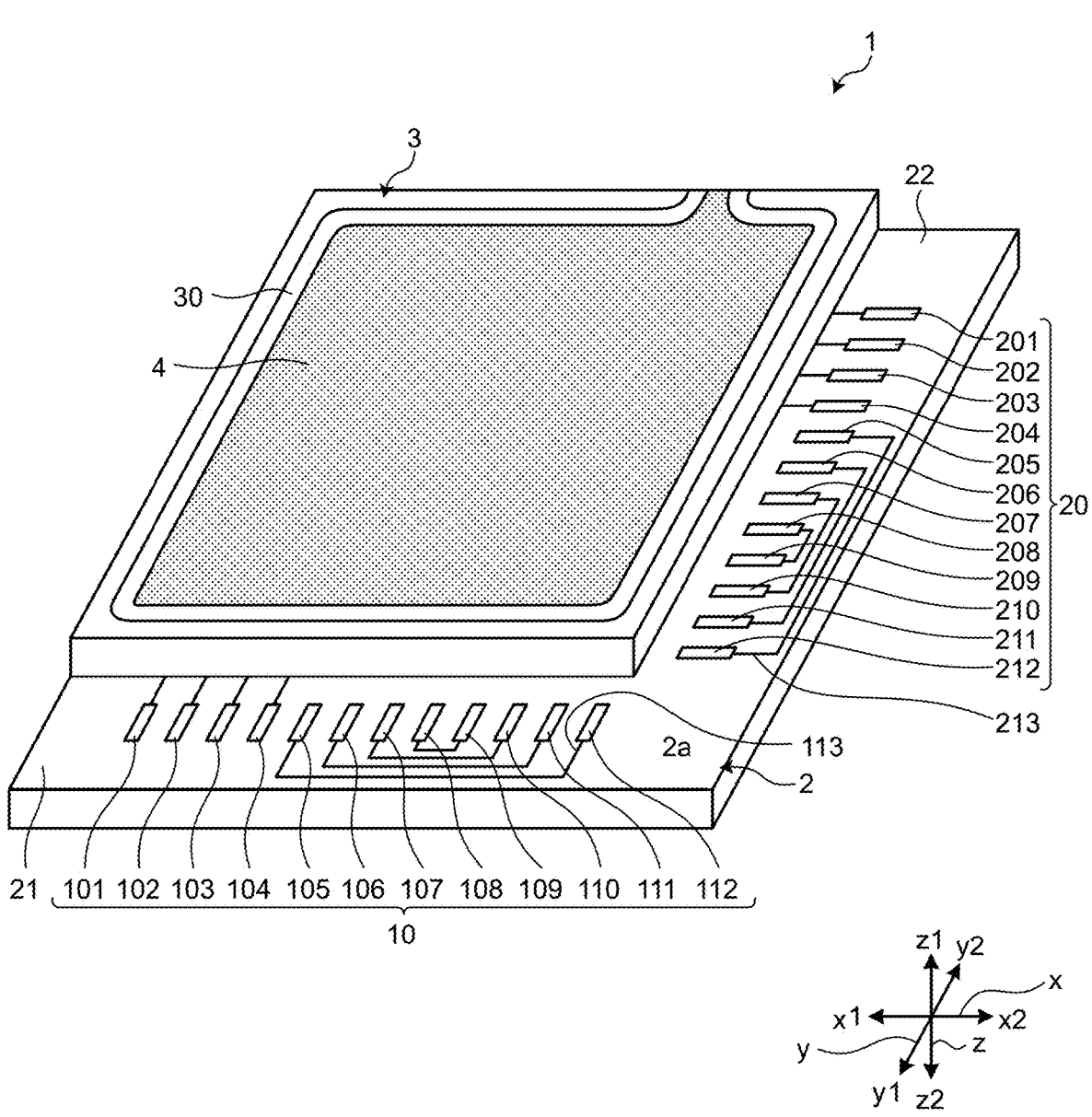
FIG. 13 is a perspective view of a liquid crystal light distribution panel according to an embodiment.
Figure 14:
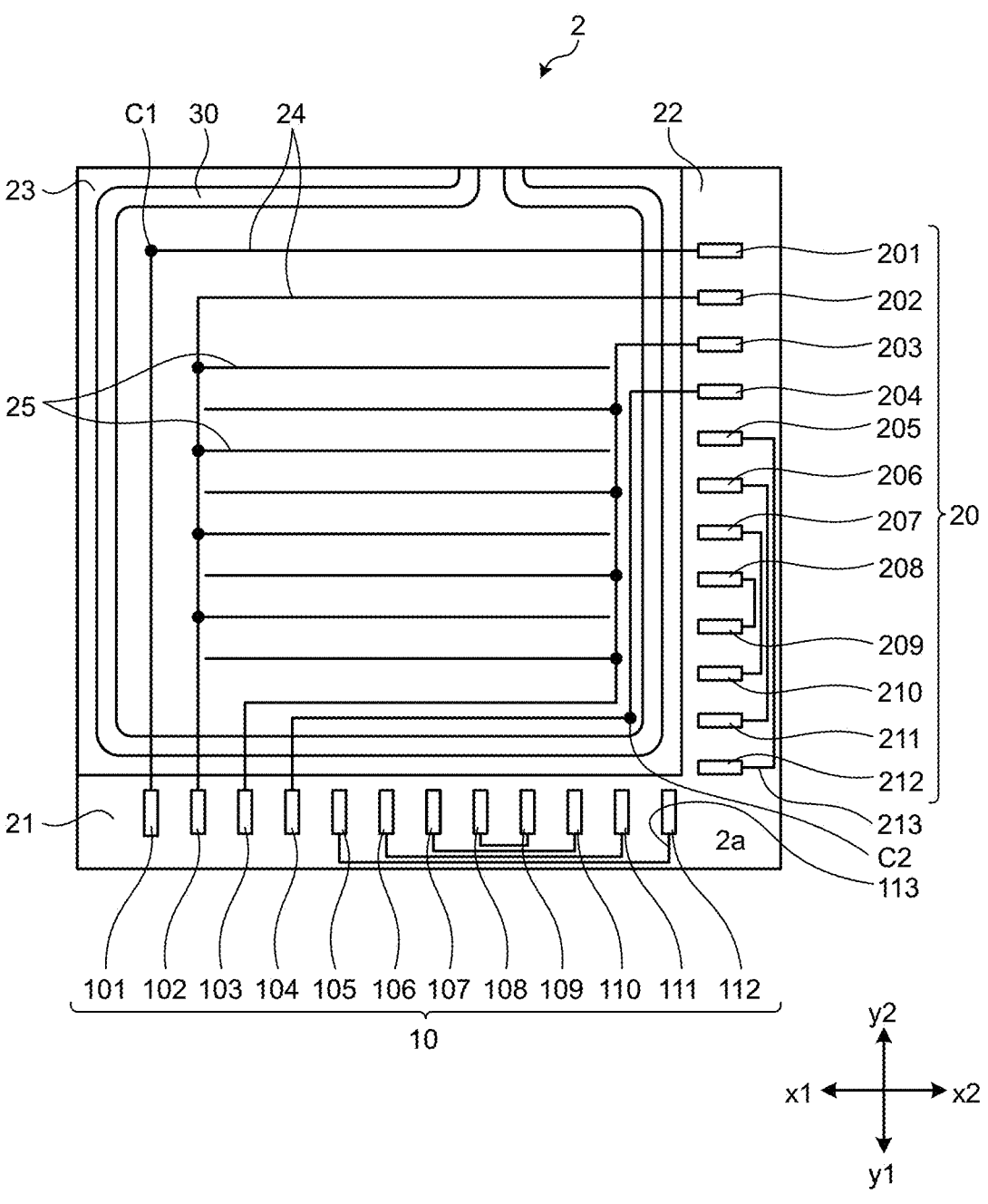
FIG. 14 is a plan view illustrating wiring of an array substrate of the liquid crystal light distribution panel according to the embodiment.
Figure 15:
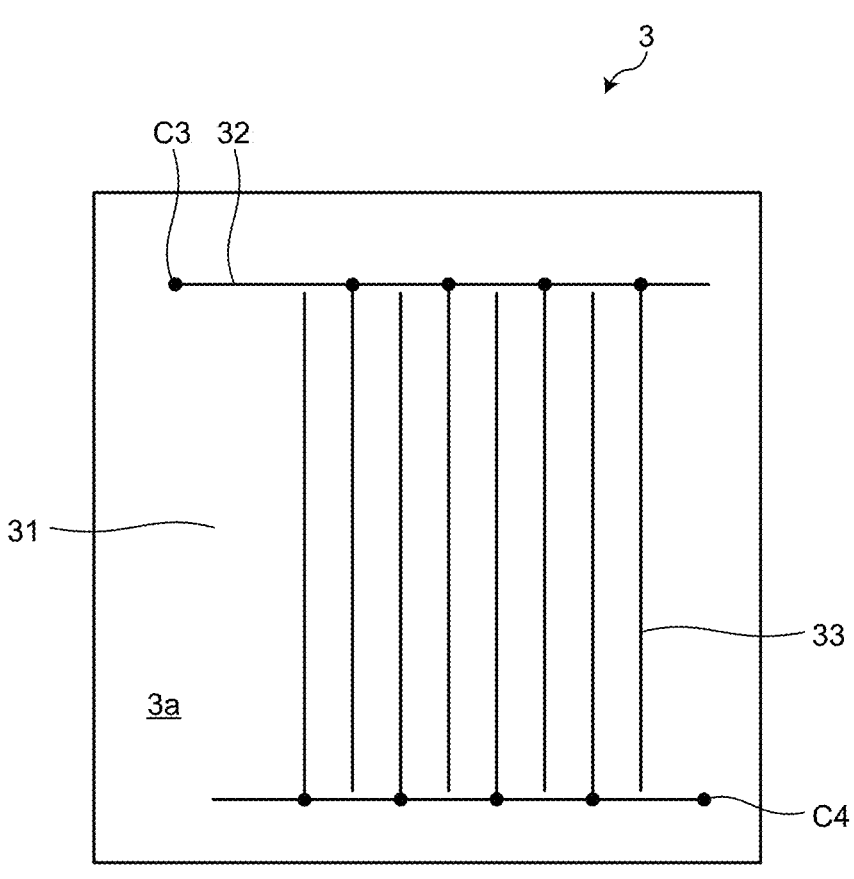
FIG. 15 is a plan view illustrating wiring of a counter substrate of the liquid crystal light distribution panel according to the embodiment.
Figure 15:
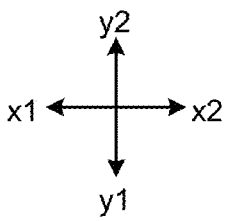
Figure 16:
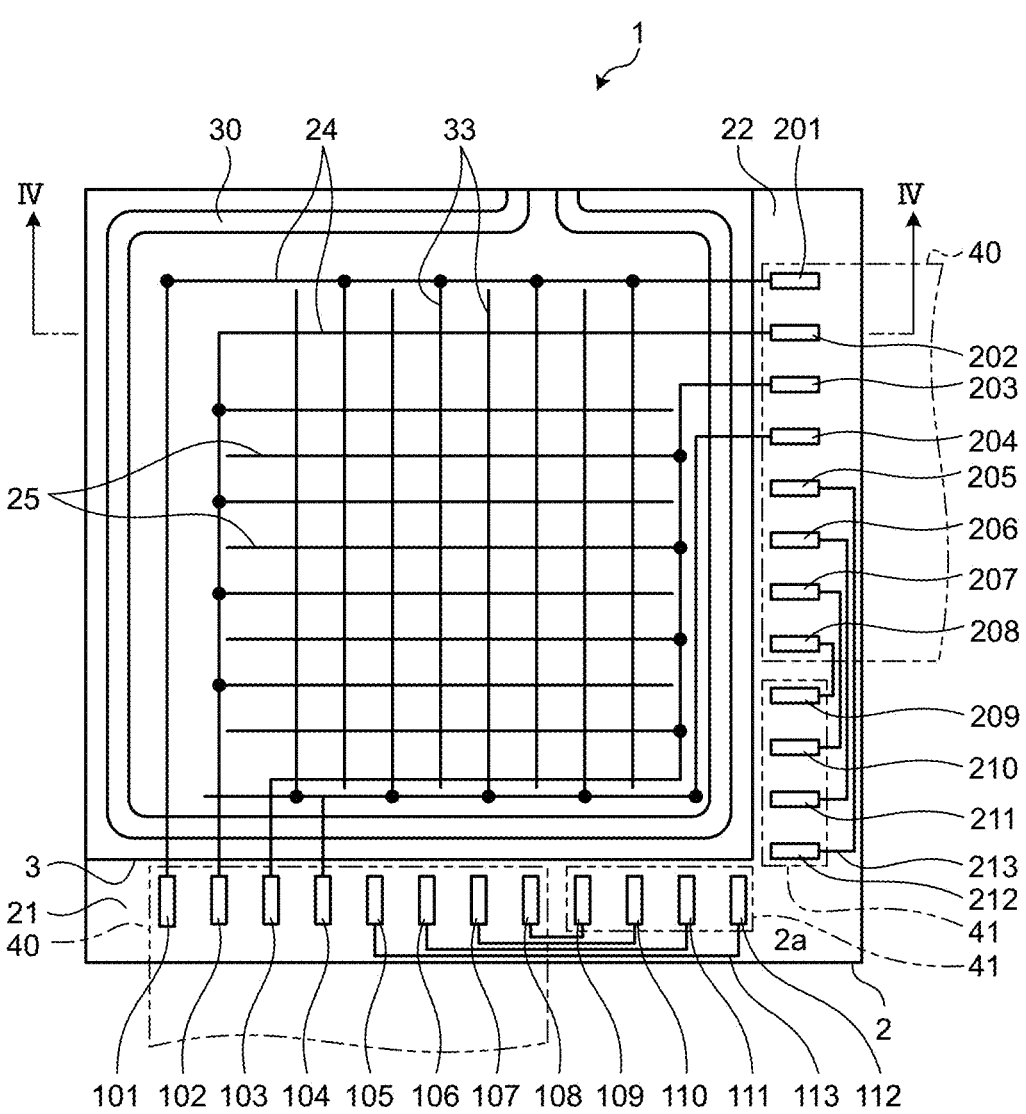
FIG. 16 is a plan view illustrating wiring of the liquid crystal light distribution panel according to the embodiment.
Figure 16:
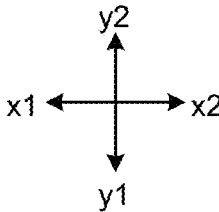
Figure 17:
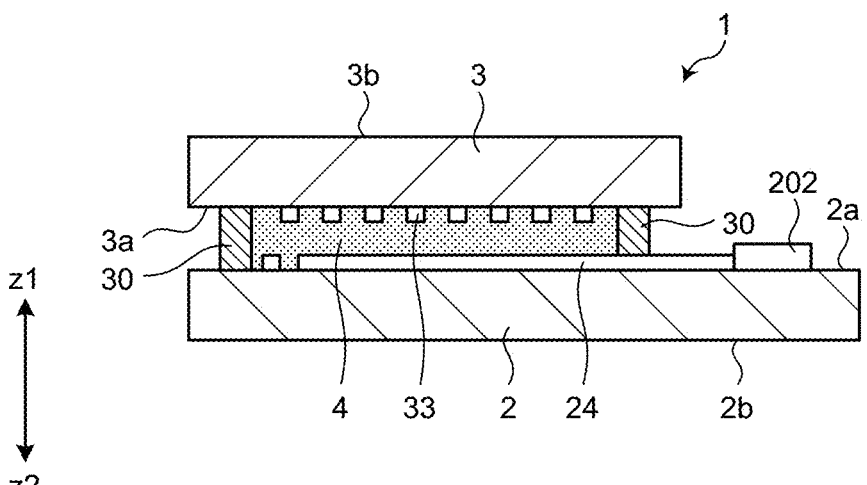
FIG. 17 is a sectional view along line IV-IV in FIG. 16.

FIG. 13 is a perspective view of a liquid crystal light distribution panel according to an embodiment. FIG. 14 is a plan view illustrating wiring of an array substrate of the liquid crystal light distribution panel according to the embodiment when viewed from above. FIG. 15 is a plan view illustrating wiring of a counter substrate of the liquid crystal light distribution panel according to the embodiment when viewed from above. FIG. 16 is a plan view illustrating wiring of the liquid crystal light distribution panel according to the embodiment when viewed from above. FIG. 17 is a sectional view taken along line IV-IV in FIG. 16. Note that, in an xyz coordinate system illustrated in FIGS. 13 to 16, a direction along an x1 direction and an x2 direction is referred to as an x direction. The x1 direction is opposite to the x2 direction. A direction along a y1 direction and a y2 direction is referred to as a y direction. The y1 direction is opposite to the y2 direction. A direction along a z1 direction and a z2 direction is referred to as a z direction. The z1 direction is opposite to the z2 direction. The x direction is orthogonal to the y direction. A plane including the x direction and the y direction is orthogonal to the z direction.

As illustrated in FIG. 13, the liquid crystal light distribution panel 1 includes an array substrate 2, a counter substrate 3, a liquid crystal layer 4, and a seal material 30.

As illustrated in FIGS. 13 and 16, the array substrate (first substrate) 2 is larger than the counter substrate (second substrate) 3. In other words, the area of the counter substrate (second substrate) 3 is smaller than the area of the array substrate (first substrate) 2. The array substrate 2 includes a transparent glass 23 (refer to FIG. 14). The counter substrate 3 includes a transparent glass 31 (refer to FIG. 15). In the embodiment, the array substrate 2 and the counter substrate 3 have square shapes in a plan view from above, but the shape of each substrate according to the present disclosure is not limited to a square shape. A first terminal group area 21 and a second terminal group area 22 are provided on a front surface 2a of the array substrate 2. The first terminal group area 21 is positioned at an end part of the front surface 2a of the array substrate 2 on the y1 side. The second terminal group area 22 is positioned at an end part of the front surface 2a of the array substrate 2 on the x2 side. The first terminal group area 21 and the second terminal group area 22 have L shapes when viewed from above. A first terminal group 10 is disposed in the first terminal group area 21, and a second terminal group 20 is disposed in the second terminal group area 22. Note that since the area of the counter substrate 3 is smaller than the area of the array substrate 2, the first terminal group 10 and the second terminal group 20 are exposed. The first terminal group 10 and the second terminal group 20 are also simply referred to as terminal portions.

As illustrated in FIGS. 13 and 16, the first terminal group 10 includes a first terminal 101, a second terminal 102, a third terminal 103, a fourth terminal 104, a first pad 105, a second pad 106, a third pad 107, a fourth pad 108, a fifth pad 109, a sixth pad 110, a seventh pad 111, and an eighth pad 112. The first terminal 101, the second terminal 102, the third terminal 103, the fourth terminal 104, the first pad 105, the second pad 106, the third pad 107, the fourth pad 108, the fifth pad 109, the sixth pad 110, the seventh pad 111, and the eighth pad 112 are sequentially arranged in a right-left direction from the x1 side toward the x2 side. The first pad 105 and the eighth pad 112 are electrically coupled to each other through a lead line 113. The second pad 106 and the seventh pad 111 are electrically coupled to each other through a lead line 113. The third pad 107 and the sixth pad 110 are electrically coupled to each other through a lead line 113. The fourth pad 108 and the fifth pad 109 are electrically coupled to each other through a lead line 113.

As illustrated in FIGS. 13 and 16, the second terminal group 20 includes a fifth terminal 201, a sixth terminal 202, a seventh terminal 203, an eighth terminal 204, a ninth pad 205, a tenth pad 206, an eleventh pad 207, a twelfth pad 208, a thirteenth pad 209, a fourteenth pad 210, a fifteenth pad 211, and a sixteenth pad 212. The fifth terminal 201, the sixth terminal 202, the seventh terminal 203, the eighth terminal 204, the ninth pad 205, the tenth pad 206, the eleventh pad 207, the twelfth pad 208, the thirteenth pad 209, the fourteenth pad 210, the fifteenth pad 211, and the sixteenth pad 212 are sequentially arranged in a front-back direction from the y2 side toward the y1 side. The ninth pad 205 and the sixteenth pad 212 are electrically coupled to each other through a lead line 213. The tenth pad 206 and the fifteenth pad 211 are electrically coupled to each other through a lead line 213. The eleventh pad 207 and the fourteenth pad 210 are electrically coupled to each other through a lead line 213. The twelfth pad 208 and the thirteenth pad 209 are electrically coupled to each other through a lead line 213.

Note that, as illustrated in FIG. 13, the counter substrate 3 is disposed on an upper side (z1 side) relative to the array substrate 2. The seal material 30 and the liquid crystal layer 4 are provided between the counter substrate 3 and the array substrate 2. The seal material 30 is provided in an annular shape along the outer periphery of the counter substrate 3 and the inside of the seal material 30 is filled with the liquid crystal layer 4. Note that a region in which the liquid crystal layer 4 is provided is an active region, the outside of the liquid crystal layer 4 is a frame region, and the first terminal group area 21 and the second terminal group area 22 are terminal regions.

Wiring of the array substrate 2 and the counter substrate 3 will be described below. Note that, as illustrated in FIG. 17, wiring is provided on a front surface of the front and back surfaces of each substrate. In other words, a surface on which wiring is provided is referred to as a front surface, and a surface opposite the front surface is referred to as a back surface. Specifically, as illustrated in FIG. 17, wiring is provided on the front surface 2a of the upper side among the front surface 2a and a back surface 2b of the array substrate 2, and wiring is provided on the front surface 3a of the lower side among a front surface 3a and a back surface 3b of the counter substrate 3. In this manner, the front surface 2a of the array substrate 2 and the front surface 3a of the counter substrate 3 are disposed facing each other with the liquid crystal layer 4 interposed therebetween.

As illustrated in FIG. 14, wires 24 and first electrodes 25 are provided on the front surface 2a of the transparent glass 23 of the array substrate 2. Specifically, the first terminal 101 and the fifth terminal 201 are electrically coupled to each other through a wire 24. The second terminal 102 and the sixth terminal 202 are electrically coupled to each other through a wire 24. The third terminal 103 and the seventh terminal 203 are electrically coupled to each other through a wire 24. The fourth terminal 104 and the eighth terminal 204 are electrically coupled to each other through a wire 24. A plurality of first electrodes 25 are coupled to the wire 24 coupling the second terminal 102 and the sixth terminal 202. A plurality of first electrodes 25 are coupled to the wire 24 coupling the third terminal 103 and the seventh terminal 203. Note that couplers C1 and C2 are provided on the wires 24.

As illustrated in FIG. 15, wires 32 and second electrodes 33 are provided on the front surface 3a of the counter substrate 3. Specifically, the wires 32 are provided on the y1 side and the y2 side, respectively. The wires 32 extend in the x direction. The second electrodes 33 are electrically coupled to the wires 32. The second electrodes 33 extend in the y direction. Note that couplers C3 and C4 are provided on the wires 32. In the example illustrated in FIGS. 14 to 16, the number of first electrodes 25 and the number of second electrodes 33 are eight, but these numbers are schematic and are not necessarily the actual numbers of first electrodes 25 and second electrodes 33. The number of first electrodes 25 and the number of second electrodes 33 only need to be equal to or larger than two and thus may be equal to or larger than nine.

As illustrated in FIGS. 16 and 17, the counter substrate 3 is disposed at an interval on the upper side relative to the array substrate 2. The liquid crystal layer 4 is filled between the array substrate 2 and the counter substrate 3. The coupler C1 of the array substrate 2 and the coupler C3 of the counter substrate 3 are electrically coupled to each other through a conductive pillar (not illustrated). The coupler C2 of the array substrate 2 and the coupler C4 of the counter substrate 3 are electrically coupled to each other through a conductive pillar (not illustrated).

As illustrated in FIG. 16, the first terminal 101, the second terminal 102, the third terminal 103, the fourth terminal 104, the first pad 105, the second pad 106, the third pad 107, and the fourth pad 108 can be electrically coupled to flexible printed circuits (FPC) 40 illustrated with dashed and double-dotted lines. For example, the liquid crystal light distribution panels 1-1 to 1-4 are each coupled to the D/A converter 64 through the individually provided FPC 40.

Figure 18:
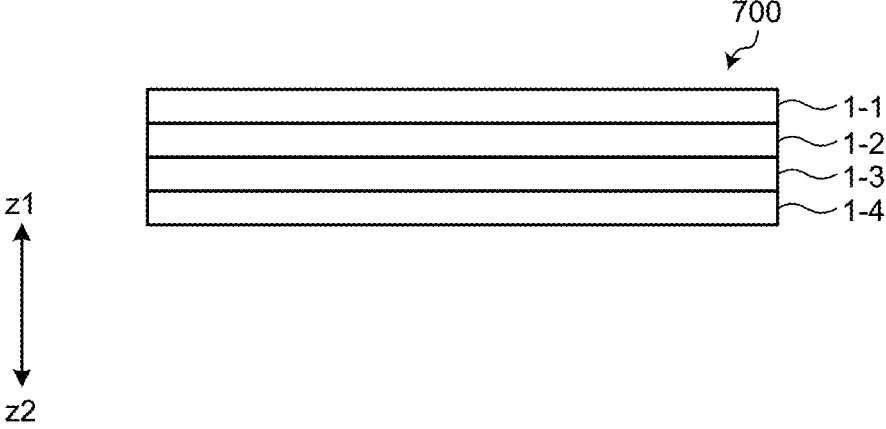
FIG. 18 is a schematic diagram illustrating the configuration of a liquid crystal light distribution part.

FIG. 18 is a schematic diagram illustrating the configuration of the liquid crystal light distribution part 700. As illustrated in FIG. 18, the liquid crystal light distribution part 700 includes, for example, four liquid crystal light distribution panels 1-1 to 1-4 stacked in the z direction. The four liquid crystal light distribution panels 1-1 to 1-4 are the liquid crystal light distribution panels 1-1 to 1-4 described above with reference to FIGS. 13 to 17. The four liquid crystal light distribution panels 1-1 to 1-4 are stacked so that the liquid crystal layers 4 thereof overlap one another and disposition of the first electrodes 25 and the second electrodes 33 included in each light modulation panel overlaps those of the others at a plan viewpoint. A plan viewpoint is the viewpoint of a front view of a plane including the x direction and the y direction. A region in which the first electrodes 25 and the second electrodes 33 are disposed functions as a light distribution control region LDA illustrated in FIG. 19 and the like to be described later.

Figure 19:
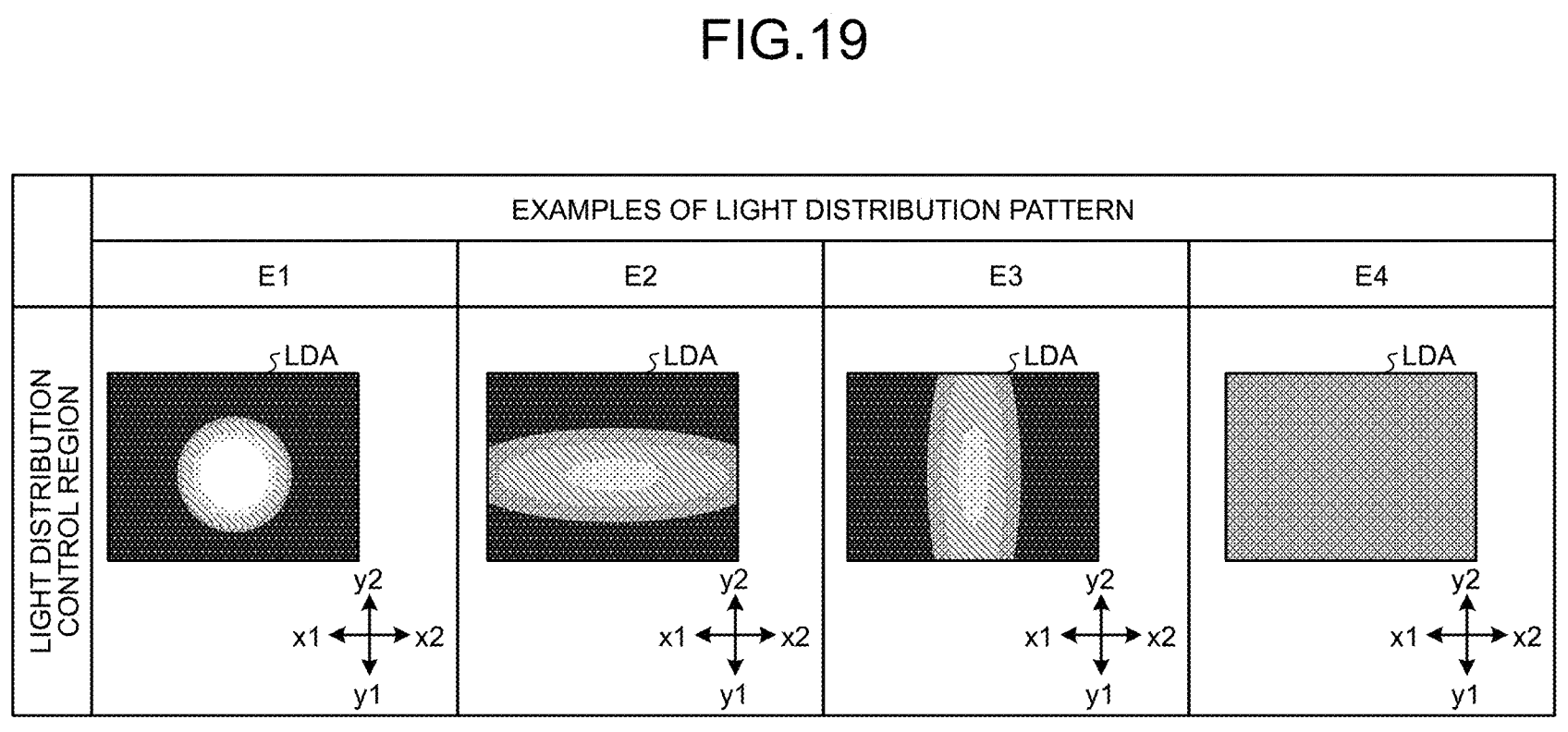

FIG. 19 is a schematic diagram illustrating an example of light distribution control by the light distribution control region LDA. As described above, the light distribution control region LDA is a region in which the plurality of first electrodes 25 and the plurality of second electrodes 33 are disposed at a plan viewpoint. In other words, the light distribution control region LDA includes a plurality of electrodes extending in the x direction and arranged in the y direction and a plurality of electrodes extending in the y direction and arranged in the x direction. The electrodes extending in the x direction and arranged in the y direction are, for example, the first electrodes 25. The electrodes extending in the y direction and arranged in the x direction are, for example, the second electrodes 33.

Since the liquid crystal light distribution part 700 includes the four liquid crystal light distribution panels 1-1 to 1-4 overlapping one another in the z direction, the electrodes extending in the x direction and arranged in the y direction and the electrodes extending in the y direction and arranged in the x direction are quadruplicated in the z direction. The light distribution control region LDA can control the transmission area and transmission degree of light traveling from one surface side of the liquid crystal light distribution part 700 toward the other surface side as in Examples E1, E2, E3, and E4 as "exemplary light distribution patterns" illustrated in FIG. 19 by controlling the potential of each of the electrodes extending in the x direction and arranged in the y direction and the electrodes extending in the y direction and arranged in the x direction of the four liquid crystal light distribution panels 1-1 to 1-4 included in the liquid crystal light distribution part 700.

Note that, in the following description, equal potential is applied to electrodes overlapping each other at a plan viewpoint. Example E1 in FIG. 19 is a schematic diagram illustrating the state of the light distribution control region LDA when viewed at a plan viewpoint from a side opposite a light source (for example, a light source 800) in a case where the potentials of the electrodes extending in the x direction and arranged in the y direction and the electrodes extending in the y direction and arranged in the x direction are all 0 volt (V). In Example E1, light from the light source transmits through the light distribution control region LDA with almost no change.

Example E2 is a schematic diagram illustrating the state of the light distribution control region LDA when viewed at a plan viewpoint from a side opposite a light source (for example, a light source 800) in a case where the potentials of the plurality of electrodes extending in the x direction and arranged in the y direction are 0 volt (V), and the potentials of the plurality of electrodes extending in the y direction and arranged in the x direction exceed 0 volt (V). Example E2 illustrates the state of the light distribution control region LDA when controlling light distribution so that, when light spread in the x direction and light spread in the y direction are compared, light from the light source relatively largely spreads in the x direction but does not much spread in the y direction.

Example E3 is a schematic diagram illustrating the state of the light distribution control region LDA when viewed at a plan viewpoint from a side opposite a light source (for example, a light source 800) in a case where the potentials of the plurality of electrodes extending in the x direction and arranged in the y direction exceed 0 volt (V), and the potentials of the plurality of electrodes extending in the y direction and arranged in the x direction are 0 volt (V). Example E3 illustrates the state of the light distribution control region LDA when controlling light distribution so that, when light spread in the x direction and light spread in the y direction are compared, light from the light source relatively largely spreads in the y direction but does not much spread in the x direction.

Example E4 is a schematic diagram illustrating the state of the light distribution control region LDA when viewed at a plan viewpoint from a side opposite a light source (for example, a light source 800) in a case where the potentials of the electrodes extending in the x direction and arranged in the y direction and the electrodes extending in the y direction and arranged in the x direction all exceed 0 volt (V). Example E4 illustrates the state of the light distribution control region LDA being entirely dark when viewed from the side opposite the light source with the light distribution control region LDA interposed therebetween because light from the light source is significantly interrupted by the light distribution control region LDA.

Note that the light distribution control region LDA only needs to include, at a plan viewpoint, two or more electrodes extending in the x direction and arranged in the y direction and two or more electrodes extending in the y direction and arranged in the x direction. A first condition is such that one light distribution control region LDA includes m electrodes extending in the x direction and arranged in the y direction and n electrodes extending in the y direction and arranged in the x direction. A second condition is such that the number of electrodes (for example, first electrodes 25) extending in the x direction and arranged in the y direction is $m \times p$ and the number of electrodes extending in the y direction and arranged in the x direction (for example, second electrodes 33) is $n \times q$ in each of the four liquid crystal light distribution panels 1-1 to 1-4. With the first and second conditions as a premise, p light distribution control regions LDA in the x direction and q light distribution control regions LDA in the y direction can be set in a matrix of rows and columns in the liquid crystal light distribution part 700. The numbers m, n, p, and q are natural numbers of two or more. Alternatively, the entire active region (region in which the liquid crystal layer 4 is provided) included in one liquid crystal light distribution panel at a plan viewpoint may be one light distribution control region LDA.

Examples E1, E2, E3, and E4 in FIG. 19 particularly illustrate difference in the shape of the light distribution area at a plan viewpoint by potential control. As described above with reference to FIGS. 16 and 17, the shape and size of the light transmission area can be more flexibly controlled because of the relation between potential provided to the first electrodes 25 and potential provided to the second electrodes 33. With this control, the shape and size of emitted light can be changed.

With respect to the claims, the present disclosure may take the following forms.

What is claimed is:

1. An illumination device comprising:
   a light source part configured to emit light to a floor surface of a room;
   a storage configured to store light distribution area data in association with time information, the light distribution area data being related to an area to be irradiated with light in the room;
   a time information acquirer configured to acquire time information related to current time;
   a light distribution area setter for setting a light distribution area of light from the light source part; and
   a controller configured to read out, from the storage, light distribution area data corresponding to the time information acquired by the time information acquirer and control the light distribution area setter based on the light distribution area data, wherein
   the light distribution area data stored in the storage is data related to a light distribution shape and a size of light to be emitted, and the light distribution area setter sets the light distribution area so that emitted light has the light distribution shape and the size.

2. The illumination device according to claim 1, wherein the light distribution area setter includes a liquid crystal light distribution panel for p-wave polarization and a liquid crystal light distribution panel for s-wave polarization,
   the liquid crystal light distribution panel for p-wave polarization and the liquid crystal light distribution panel for s-wave polarization are stacked on each other,
   a signal based on light to be emitted is provided to the liquid crystal light distribution panel for p-wave polarization and the light distribution panel for s-wave polarization,
   light emitted from the light source part is emitted through the liquid crystal light distribution panel for p-wave polarization and the liquid crystal light distribution panel for s-wave polarization, and accordingly, and
   the light distribution area is set based on the light distribution area data read out by the controller.

3. The illumination device according to claim 2, wherein the light distribution area data includes the light distribution shape and the size, and
   the controller applies voltage to the liquid crystal light distribution panel based on the light distribution shape and the size.

4. The illumination device according to claim 1, wherein the controller reads out light distribution area data corresponding to time close to current time from the storage.

5. The illumination device according to claim 1, wherein the storage stores light distribution area data in association with time information from sunrise time to sunset time.

6. The illumination device according to claim 1, wherein the controller controls the light distribution area setter so that the light distribution area has a shape close to the shape of a dark part in the room.

7. An illumination device comprising:
   a light source part configured to emit light to a floor surface of a room;
   a storage configured to store light distribution area data in association with time information, the light distribution area data being related to an area to be irradiated with light in the room;
   a time information acquirer configured to acquire time information related to current time;
   a light distribution area setter for setting a light distribution area of light from the light source part; and
   a controller configured to read out, from the storage, light distribution area data corresponding to the time information acquired by the time information acquirer and control the light distribution area setter based on the light distribution area data, wherein
   the light distribution area setter includes a liquid crystal light distribution panel for p-wave polarization and a liquid crystal light distribution panel for s-wave polarization,
   the liquid crystal light distribution panel for p-wave polarization and the liquid crystal light distribution panel for s-wave polarization are stacked on each other,
   a signal based on light to be emitted is provided to the liquid crystal light distribution panel for p-wave polarization and the light distribution panel for s-wave polarization,
   light emitted from the light source part is emitted through the liquid crystal light distribution panel for p-wave polarization and the liquid crystal light distribution panel for s-wave polarization, and accordingly, and
   the light distribution area is set based on the light distribution area data read out by the controller.

8. The illumination device according to claim 7, wherein the light distribution area data includes a light distribution shape and a size, and
   the controller applies voltage to the liquid crystal light distribution panel based on the light distribution shape and the size.

9. The illumination device according to claim 7, wherein the controller reads out light distribution area data corresponding to time close to current time from the storage.

10. The illumination device according to claim 7, wherein the storage stores light distribution area data in association with time information from sunrise time to sunset time.

11. The illumination device according to claim 7, wherein the controller controls the light distribution area setter so that the light distribution area has a shape close to the shape of a dark part in the room.

* * * * *